United States Patent
Daio et al.

(10) Patent No.: US 9,738,146 B2
(45) Date of Patent: Aug. 22, 2017

(54) WEATHER STRIP FOR AUTOMOBILES

(71) Applicants: NISHIKAWA RUBBER CO., LTD., Hiroshima-shi, Hiroshima-ken (JP); TOYOTA JIDOSHA KABUSHIKI KAISHA, Toyota-shi, Aichi-ken (JP)

(72) Inventors: Masayuki Daio, Hiroshima-ken (JP); Tomonori Nakamura, Akitakata (JP); Noriyuki Otsuka, Toyota (JP)

(73) Assignees: NISHIKAWA RUBBER CO., LTD., Hiroshima-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/191,049

(22) Filed: Jun. 23, 2016

(65) Prior Publication Data

US 2017/0001502 A1 Jan. 5, 2017

(30) Foreign Application Priority Data

Jul. 3, 2015 (JP) .................................. 2015-134825

(51) Int. Cl.
*B60J 10/08* (2006.01)
*B60J 10/25* (2016.01)
(Continued)

(52) U.S. Cl.
CPC ............... *B60J 10/25* (2016.02); *B60J 10/24* (2016.02); *B60J 10/32* (2016.02); *B60J 10/84* (2016.02)

(58) Field of Classification Search
CPC ... B60J 10/24; B60J 10/32; B60J 10/80; B60J 10/84
(Continued)

(56) References Cited

U.S. PATENT DOCUMENTS 4,143,497 A * 3/1979 Offenbacher ............ B60J 10/24
49/490.1
4,232,081 A * 11/1980 Pullan ..................... B60J 10/24
428/122

(Continued)

FOREIGN PATENT DOCUMENTS

DE 202004012508 U1 4/2005
DE 102005060976 A1 6/2007
(Continued)

OTHER PUBLICATIONS

Extended European Search Report issued by the European Patent Office in relation to European Patent Application No. 16173637.6-1757 dated Dec. 8, 2016 (8 pages).

*Primary Examiner* — Justin Rephann
(74) *Attorney, Agent, or Firm* — Robert P. Michal, Esq.; Carter, Deluca, Farrell & Schmidt, LLP

(57) ABSTRACT

A hollow seal member integrally molded with an installation base member includes a first hollow wall with a first bent point as a part bendable toward an outside and a second hollow wall with a second bent point as a part bendable toward the outside. A protrusion is formed on an end of a second outer-cabin side wall, which is continuous with an outer surface of the second outer-cabin side wall, protrudes upward with respect to the first hollow wall, and makes elastic contact with a door. An end of a first outer-cabin side wall connects with a position on the second outer-cabin side wall as an inner side of the hollow seal member, from which the protrusion protrudes toward the outer-cabin side. A thick part, which protrudes toward an outer side, is formed on the first outer-cabin side wall as the outer side of the hollow seal member.

9 Claims, 5 Drawing Sheets

(51) Int. Cl.
*B60J 10/84* (2016.01)
*B60J 10/24* (2016.01)
*B60J 10/32* (2016.01)

(58) Field of Classification Search
USPC .............................................. 49/490.1, 498.1
See application file for complete search history.

(56) References Cited

U.S. PATENT DOCUMENTS

| | | | | | |
|---|---|---|---|---|---|
| 4,617,220 | A * | 10/1986 | Ginster | ................ | E06B 7/2309 428/122 |
| 4,769,950 | A * | 9/1988 | Ogawa | .................... | B60J 10/21 428/122 |
| 4,819,382 | A * | 4/1989 | Suzuki | ................ | E06B 7/2309 49/490.1 |
| 4,848,035 | A * | 7/1989 | Sakuma | .................. | B60J 10/24 49/490.1 |
| 4,952,442 | A * | 8/1990 | Warner | ................. | B60J 10/242 428/122 |
| 5,072,546 | A * | 12/1991 | Ogawa | .................... | B60J 10/24 49/475.1 |
| 5,079,882 | A * | 1/1992 | Bahout | .................... | B60J 10/24 49/490.1 |
| 5,122,406 | A * | 6/1992 | Sakamaki | ............. | B60J 10/233 296/93 |
| 5,305,553 | A * | 4/1994 | Shimizu | .................. | B60J 10/24 49/490.1 |
| 5,423,147 | A * | 6/1995 | Dupuy | ................. | E06B 7/2303 428/122 |
| 5,622,008 | A * | 4/1997 | King | .................... | E06B 7/2309 49/490.1 |
| 5,626,383 | A * | 5/1997 | Lee | ........................ | B60J 10/24 296/146.9 |
| 6,132,847 | A * | 10/2000 | Okita | .................... | C08J 9/0066 264/54 |
| 6,395,371 | B1 * | 5/2002 | Nozaki | .................... | B60J 10/24 428/122 |
| 6,802,666 | B1 * | 10/2004 | Bormann | ............... | B60J 10/233 296/93 |
| 6,972,140 | B2 * | 12/2005 | Watanabe | ............. | B60J 10/242 428/122 |
| 8,646,214 | B2 * | 2/2014 | Otsuka | .................... | B60J 10/24 49/490.1 |
| 8,667,740 | B1 * | 3/2014 | Hashimoto | .............. | B60J 10/24 49/490.1 |
| 8,893,438 | B2 * | 11/2014 | Hamada | .................. | B60J 10/08 49/483.1 |
| 2003/0121211 | A1 * | 7/2003 | Hashimoto | .............. | B60J 10/24 49/490.1 |
| 2005/0022454 | A1 * | 2/2005 | Aida | ........................ | B60J 10/24 49/490.1 |
| 2005/0064135 | A1 * | 3/2005 | Perrin | ..................... | B60J 10/24 428/122 |
| 2005/0193635 | A1 * | 9/2005 | Hemauer | ................. | B60J 10/18 49/490.1 |
| 2006/0186695 | A1 * | 8/2006 | Hiroe | ..................... | B60J 10/17 296/146.9 |
| 2008/0000165 | A1 * | 1/2008 | Ochiai | .................... | B60J 10/24 49/490.1 |
| 2008/0148646 | A1 * | 6/2008 | Nozaki | .................... | B60J 10/24 49/490.1 |
| 2008/0295414 | A1 * | 12/2008 | Miyakawa | ............... | B60J 10/32 49/490.1 |
| 2010/0313486 | A1 * | 12/2010 | Kuribayashi | .............. | B60J 7/22 49/490.1 |
| 2011/0219699 | A1 * | 9/2011 | Miyakawa | .......... | B29C 47/0023 49/490.1 |
| 2012/0073209 | A1 * | 3/2012 | Otsuka | .................... | B60J 10/32 49/489.1 |
| 2012/0161463 | A1 * | 6/2012 | Mori | ....................... | B60J 10/24 296/107.04 |
| 2012/0240473 | A1 * | 9/2012 | Minoura | ................. | B60J 10/82 49/489.1 |
| 2014/0059941 | A1 * | 3/2014 | Brookman | ........... | B60J 10/0002 49/490.1 |
| 2014/0311040 | A1 * | 10/2014 | One | ........................ | B60J 10/30 49/490.1 |

FOREIGN PATENT DOCUMENTS

| | | |
|---|---|---|
| EP | 0435678 A1 | 7/1991 |
| JP | H63-159357 | 10/1988 |
| JP | 2010030445 A | 2/2010 |
| JP | 2010188850 A | 9/2010 |
| JP | 2013-100010 A | 5/2013 |

* cited by examiner

WEATHER STRIP FOR AUTOMOBILES

CROSS REFERENCE TO RELATED APPLICATION

This application claims the benefit under 35 USC §119 of JP Patent Application JP 2015-134825 filed Jul. 3, 2015, the entire disclosure of which is incorporated herein by reference.

BACKGROUND INFORMATION

The present invention relates to weather strips operatively coupled along circumferential edges of door openings of automobile bodies, which elastically engage doors when the doors are in closed positions to seal inside and outside of the automobiles.

As shown in FIG. 5, a weather strip 10 for automobiles is operatively coupled along a circumferential edge of an opening of a back door 100 of an automobile. The weather strip 10 for automobiles elastically engages the back door 100 when the back door 100 is in a closed position.

As shown in FIG. 6, the weather strip 10 for automobiles includes an installation base member 11 and a hollow seal member 12, which are integrally molded. The installation base member 11 has a substantially U-shaped cross-section in which a flange 101 formed along the circumferential edges of the opening of the back door 100 is inserted. The hollow seal member 12 on a connecting wall 11c of the installation base member 11 elastically engages the back door 100 to seal inside and outside of the automobile.

A first side wall 11a and a second side wall 11b of the installation base member 11 have a plurality of convexes 13 inside for holding the flange 101. A small lip 14 and a seal lip 15 are formed on a top end and an outside of the first side wall 11a, respectively. A decorative lip 16 is formed on an outside of the second side wall 11b. Sponge 17 for water stop is operatively coupled inside the connecting wall 11c of the installation base member 11. The sponge 17 touches and wraps up a top end of the flange 101 for preventing rust and entrance of water. The installation base member 11 has a core 18 embedded therein for reinforcement.

The hollow seal member 12 of the weather strip 10 for automobiles, having a round-shaped cross-section, is in common use in consideration of noise insulation performance, prevention of raindrops falling inside the automobile, and external appearance; whereas, a hollow seal member 12 shown in FIG. 6, having a shape of a pantograph in cross section, has been used (see, for example, FIG. 8 of Japanese unexamined Patent Publication No. 2013-100010). This is because the hollow seal member 12 which has the shape of pantograph is more excellent in sealing performance than the round shape to deal with back doors 100 made of resin and to be applicable to laterally openable doors.

Unfortunately, however, as shown in FIG. 7, the hollow seal member 12 having the shape of the pantograph has caused problems that a wide channel 51 having a shape of a pail appears between the back door 100 and the hollow seal member 12 while the back door 100 (or the laterally openable door) makes elastic contact with the hollow seal member 12, and water 60 collects in the channel 51. As the door 100 is opened, the water 60 thus collected drips and trickles into the automobile or splashes on passengers or luggage. Especially, when the hollow seal member 12 bends and a bent point 12P rises in a direction 70 shown by an arrow, the channel 51 appears which is large in size and has the shape of the pail. Accordingly, the structure is not favorable. The direction 70 is directed to a side of the back door 100 (outer-cabin side), and the bent point 12P is on a side of the hollow seal member 12 on which the channel 51 appears.

In this connection, FIG. 2 to FIG. 4 of Japanese unexamined Patent Publication No. 2013-100010 disclose to form a convex wall which covers a top end of the hollow seal member 12. The structure prevents appearance of the wide channel in which the water 60 collects.

The convex wall on the hollow seal member 12, which makes elastic contact with the door 100, has a shape of an arc. Accordingly, depending of an angle in which the door 100 approaches, a part of the hollow seal member 12 other than the top end may collide with the door 100 prior to the top end. The structure causes the hollow seal member 12 to slip off.

As the hollow seal member 12 slips off, a sufficient sealing function is not performed and the water may enter the inner-cabin side. If worst comes worst, the weather strip for automobiles may come off the flange.

Therefore, an object of the present invention is to provide the weather strips for automobiles capable of preventing slipping-off of the hollow seal members and performing the sufficient sealing function.

SUMMARY

In order to achieve the above-mentioned object, according to one aspect of the invention, a weather strip (20) for automobiles is provided, the weather strip (20) including: an installation base member (21) operatively coupled along a circumferential edge of an opening of a door (100) of an automobile body; and a hollow seal member (22) which is integrally molded with the installation base member (21) and makes elastic contact with the door (100); wherein: the hollow seal member (22) includes a first hollow wall (221) with a first bent point (221P) and a second hollow wall (222) with a second bent point (222P), the first bent point (221P) being a part of the first hollow wall (221) in a cross-sectional longitudinal direction bendable toward an outside of the hollow seal member (22), the second bent point (222P) being a part of the second hollow wall (222) in a cross-sectional longitudinal direction bendable toward the outside of the hollow seal member (22), the first hollow wall (221) including a first outer-cabin side wall (221a) and a first inner-cabin side wall (221b), the second hollow wall (222) including a second outer-cabin side wall (222a) and a second inner-cabin side wall (222b), the first hollow wall (221) and the second hollow wall (222) being connected with each other in a direction that the first bent point (221P) and the second bent point (222P) are spaced out from each other; a protrusion (31) is formed on an end of the second outer-cabin side wall (222a) of the second hollow wall (222), the protrusion (31) being continuous with an outer surface of the second outer-cabin side wall (222a), the protrusion (31) protruding upward with respect to the first hollow wall (221), the protrusion (31) making elastic contact with the door (100);
an end of the first outer-cabin side wall (221a) of the first hollow wall (221) connects with a position on the second outer-cabin side wall (222a) of the second hollow wall (222), the position being on an inner side of the hollow seal member (22), the protrusion (31) protruding toward the outer-cabin side from the position; and
a thick part (32) is formed on a position on the first outer-cabin side wall (221a) of the first hollow wall (221), the position being on an outer side of the hollow seal member (22), the thick part (32) protruding toward the outer side.

In addition, according to an aspect of the present invention, the thick part (32) is gradually reduced in thickness or rigidity toward a side of the first bent point (221P) of the first outer-cabin side wall (221a), and when the hollow seal member (22) makes elastic contact with the door (100), the hollow seal member (22) bends with the first bent point (221P) sinking toward the inner-cabin side.

In addition, according to an aspect of the present invention, a top end (31a) of the protrusion (31) is on a side of the first hollow wall (221) with respect to a straight line (40) which divides the hollow seal member (22) in cross section into the side of the first hollow wall (221) and a side of the second hollow wall (222).

Symbols in parentheses show constituents or items corresponding to the drawings.

A term "outer-cabin side" means a side of the door (100) facing the hollow seal member (22) of the weather strip (20) when the door is in a closed position. A term "inner-cabin side" means a side opposite to the "outer-cabin side".

According to the weather strip for automobiles of the present invention, the hollow seal member integrally molded with the installation base member has a shape of pantograph in cross section. The hollow seal member includes the first hollow wall with the first bent point and the second hollow wall with the second bent point. The first bent point is the part of the first hollow wall in the cross-sectional longitudinal direction bendable toward the outside of the hollow seal member and the second bent point is the part of the second hollow wall in the cross-sectional longitudinal direction bendable toward the outside of the hollow seal member. The first hollow wall includes the first outer-cabin side wall and the first inner-cabin side wall. The second hollow wall includes the second outer-cabin side wall and the second inner-cabin side wall. The first hollow wall and the second hollow wall are connected with each other in the direction that the first bent point and the second bent point are spaced out from each other. Accordingly, the weather strip for automobiles of the present invention having the shape of the pantograph is more excellent in sealing function than hollow seal members of the prior art having round-shaped cross-sections.

Accordingly, the weather strip for automobiles of the present invention deals with back doors made of resin and is applicable to laterally openable doors (sliding doors).

In addition, the thick part is formed on the position on the first outer-cabin side wall of the first hollow wall as the outer side of the hollow seal member. The thick part protrudes toward the outer side. The protrusion on the end of the second outer-cabin side wall of the second hollow wall inclines toward the side of the first hollow wall. Accordingly, as the door is closed, the protrusion comes into contact with the door without fail even in case the door does not approach in a stable angle.

As a result, the hollow seal member hardly slips off.

As the protrusion makes elastic contact with the door, the protrusion is designed to fall toward a side of the thick part. As compared with a prior art (FIG. 7), a channel for water to collect is controlled to be small.

The structure prevents problems that, as the door is opened, the water thus collected drips and trickles into the automobile or splashes on passengers or luggage.

In addition, when the hollow seal member makes elastic contact with the door, the hollow seal member bends with the first bent point sinking toward the inner-cabin side. The structure does not allow the channel to have a shape of a pail.

As a result, amount of water which collects in the channel is controlled to be very little.

In addition, the top end of the protrusion is on the side of the first hollow wall with respect to the straight line which divides the hollow seal member in cross section into halves. Accordingly, as the protrusion makes elastic contact with the door, the protrusion falls toward the side of the thick part very easily.

BRIEF DESCRIPTION OF THE DRAWINGS

FIG. 4(a) is an I-I line enlarged cross section of FIG. 5; FIG. 4(b) is an enlarged cross section of an important part of the weather strip for automobiles of FIG. 4(a), showing a state that a hollow seal part makes elastic contact with a door and bends;

DETAILED DESCRIPTION

Figure 1:
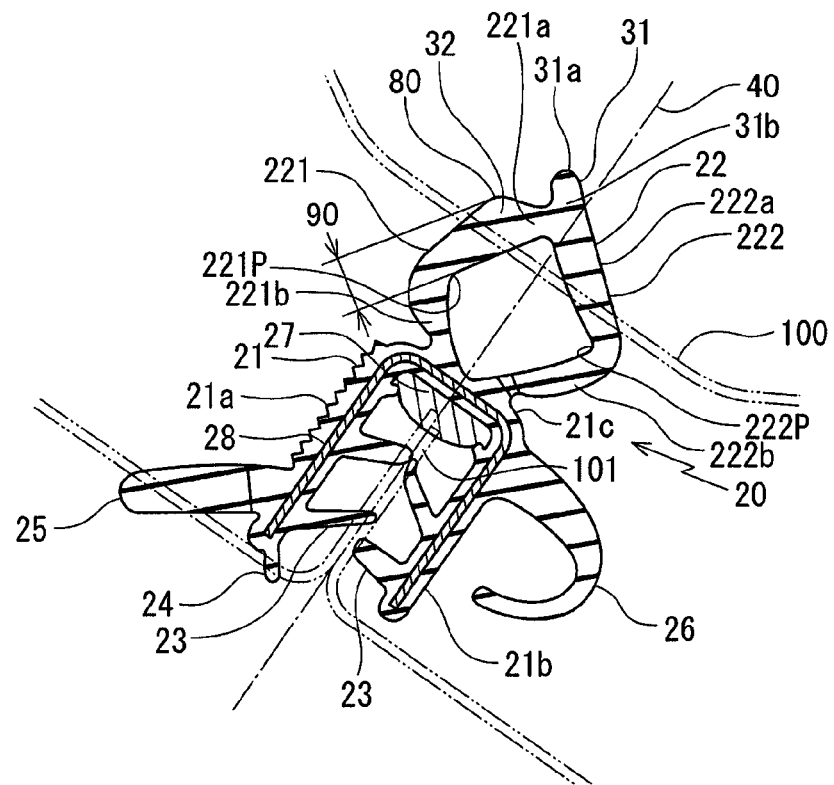
FIG. 1 is an I-I line enlarged cross section of FIG. 5, showing a weather strip for automobiles according to an embodiment of the present invention.
Figure 2:
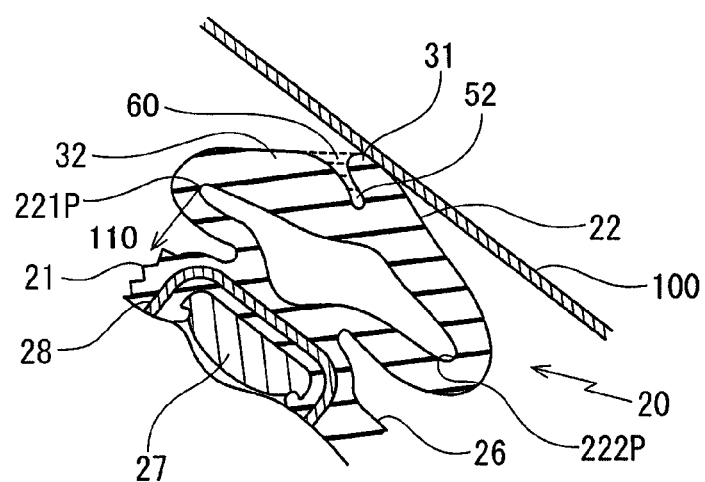
FIG. 2 is an enlarged cross section of an important part of the weather strip for automobiles of FIG. 1, showing a state that a hollow seal part makes elastic contact with a door and bends.
Figure 5:
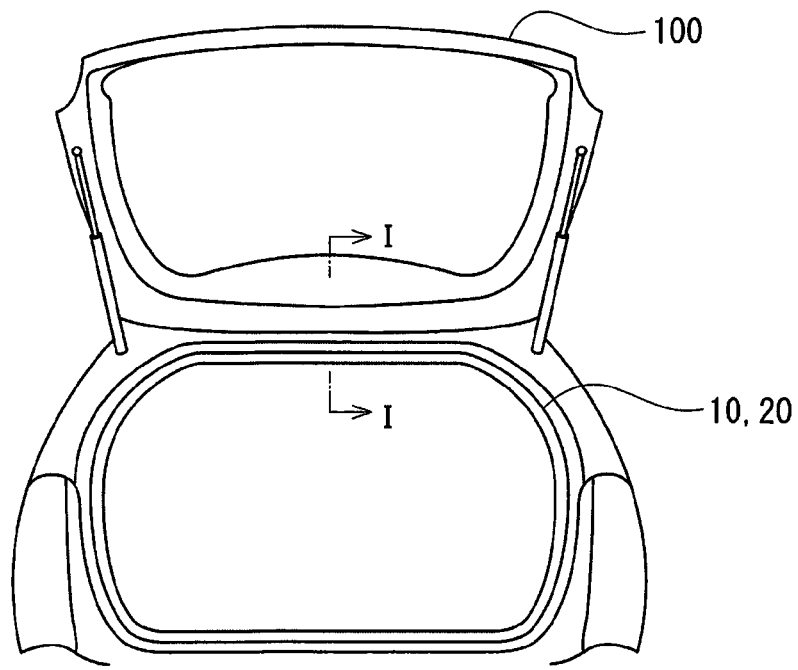
FIG. 5 is an external perspective view showing a state that a back door of an automobile is open.
Figure 6:
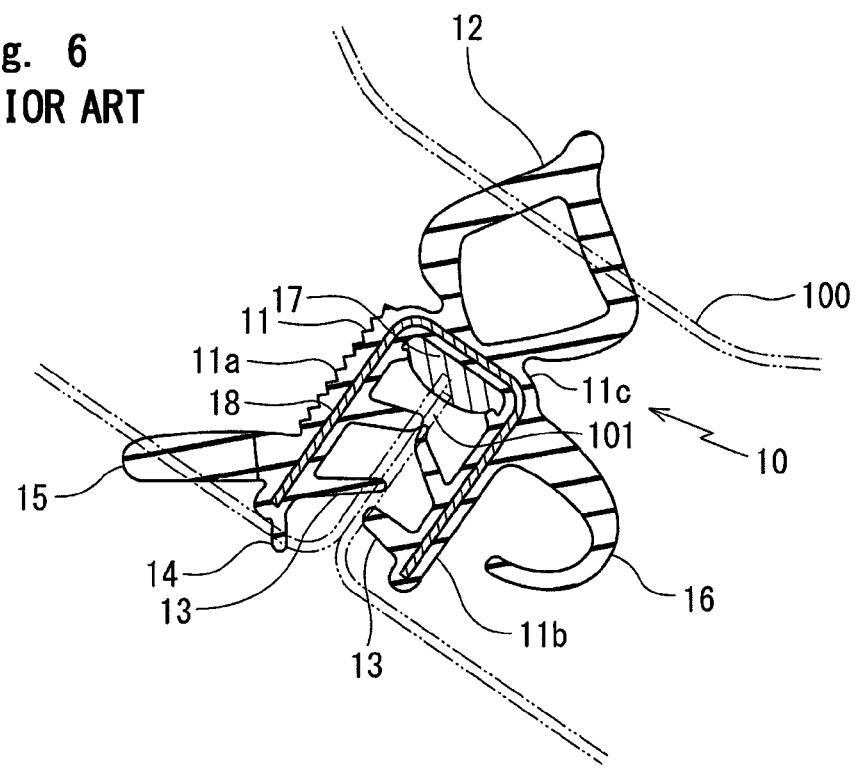
FIG. 6 is an I-I line enlarged cross section of FIG. 5, showing a weather strip for automobiles according to a prior art.

Referring to FIG. 1, FIG. 2 and FIG. 5, a weather strip 20 for automobiles according to a first embodiment of the present invention will be described. When constituents or items correspond to those in prior arts, the same symbols are used.

As shown in FIG. 5, the weather strip 20 for automobiles is operatively coupled along a back door 100. The weather strip 20 for automobiles includes an installation base member 21 and a hollow seal member 22. The installation base member 21 is fit and operatively coupled on a flange 101 formed along a circumferential edge of an opening of an automobile body. The hollow seal member 22 is integrally molded with an outer-cabin side of the installation base member 21 and, when the back door 100 is in a closed position, the hollow seal member 22 makes elastic contact with the back door 100 to seal inside and outside of the automobile.

In the present embodiment, a term "outer-cabin side" means a side of the back door 100 facing the hollow seal member 22 of the weather strip 20 when the back door 100 is in the closed position. A term "inner-cabin side" means a side opposite to the "outer-cabin side" (side of the flange 101).

The installation base member 21 has a substantially U-shaped cross-section, including a first side wall 21a, a second side wall 21*b* and a connecting wall 21*c* which connects the side walls 21*a* and 21*b*. Material of the installation base member 21 is not especially limited. Examples of the material include solid material of ethylene-propylene-diene rubber (EPDM) and sponge material of EPDM of which specific gravity is more than 0.4. The side walls 21*a* and 21*b* of the installation base member 21 have a plurality of convexes 23 (4 in the present embodiment) formed inside, which are slidably brought into contact with a surface of the flange 101 as the installation base member 21 is fit on the flange 101. A small lip 24 and a seal lip 25 are formed on a top end and an outside of the first side wall 21*a*, respectively. A decorative lip 26 having a substantially tongue-shaped cross-section is formed on a position outside the second side wall 21*b*, which is between the second side wall 21*b* and the connecting wall 21*c*. The installation base member 21 has a core 28 (made of metal or resin) embedded therein for reinforcement. The core 28 has a substantially U-shaped cross-section. Sponge 27 for water stop is operatively coupled inside the connecting wall 21*c* of the installation base member 21. The sponge 27 touches and wraps up a top end of the flange 101 for preventing rust and entrance of water.

The hollow seal member 22 is unique in cross-sectional shape. Specifically, the hollow seal member 22 has a shape of a pantograph in cross section. The hollow seal member 22 includes a first hollow wall 221 with a first bent point 221P and a second hollow wall 222 with a second bent point 222P. The first bent point 221P is a part of the first hollow wall 221 in a cross-sectional longitudinal direction bendable toward an outside of the hollow seal member 22 and the second bent point 222P is a part of the second hollow wall 222 in a cross-sectional longitudinal direction bendable toward the outside of the hollow seal member 22. The first hollow wall 221 includes a first outer-cabin side wall 221*a* and a first inner-cabin side wall 221*b*. The second hollow wall 222 includes a second outer-cabin side wall 222*a* and a second inner-cabin side wall 222*b*. The first hollow wall 221 and the second hollow wall 222 are connected with each other in a direction that the first bent point 221P and the second bent point 222P are spaced out from each other. The first hollow wall 221 is bent into a substantially V-shape in cross section around the first bent point 221P. The second hollow wall 222 is bent into the substantially V-shape in cross section around the second bent point 222P.

A protrusion 31 is formed on an end of the second outer-cabin side wall 222*a* of the second hollow wall 222. The protrusion 31 is continuous with a side surface of the second outer-cabin side wall 222*a* and extends along a direction in which the second outer-cabin side wall 222*a* extends. The protrusion 31 protrudes upward with respect to the first hollow wall 221 and makes elastic contact with the back door 100. The second outer-cabin side wall 222*a* inclines toward a side of the first hollow wall 221. Accordingly, the protrusion 31 on the second outer-cabin side wall 222*a* also inclines toward the side of the first hollow wall 221. An end of the first outer-cabin side wall 221*a* of the first hollow wall 221 connects with a position at an inner side of the hollow seal member 22 on the second outer-cabin side wall 222*a* of the second hollow wall 222, and a top end 31*a* of the protrusion 31 protrudes toward the outer-cabin side from the position.

An end of the second inner-cabin side wall 222*b* of the second hollow wall 222 connects with a position on an outside of the connecting wall 21*c* of the installation base member 21, which is close to the second side wall 21*b*. An end of a first inner-cabin side wall 221*b* of the first hollow wall 221 connects with a position on the outside of the connecting wall 21*c* of the installation base member 21, which is close to the first side wall 21*a*.

In the present embodiment, the second outer-cabin side wall 222*a* is slightly longer in cross section than the second inner-cabin side wall 222*b*. But, the second outer-cabin side wall 222*a* may be as long as the second inner-cabin side wall 222*b*, or the second inner-cabin side wall 222*b* may be longer than the second outer-cabin side wall 222*a*. The second outer-cabin side wall 222*a* is gradually reduced in thickness in cross section toward the second bent point 222P. Ends of the first inner-cabin side wall 221*b* and the second inner-cabin side wall 222*b* as base roots when connected with the connecting wall 21*c* are thinner than at least one other part of the first inner-cabin side wall 221*b* and at least one other part of the second inner-cabin side wall 222*b*, respectively.

As shown in FIG. 1, a top end 31*a* of the protrusion 31 on the end of the second outer-cabin side wall 222*a* is on a side of the first hollow wall 221 with respect to a straight line 40 which divides the hollow seal member 22 in cross section into the side of the first hollow wall 221 and a side of the second hollow wall 222.

The top end 31*a* of the protrusion 31 is smoothly continuous with an outer surface of the second outer-cabin side wall 222*a*. The top end 31*a* of the protrusion 31 forms a curved surface in cross section. The top end 31*a* of the protrusion 31 inclines toward the side of the first hollow wall 221 and a base root 31*b* of the protrusion 31 connecting with the end of the second outer-cabin side wall 222*a* is closer to the straight line 40 than the top end 31*a*.

In addition, a thick part 32 is formed on a position on the first outer-cabin side wall 221*a* of the first hollow wall 221. The position is on an outer side of the hollow seal member 22. The thick part 32 protrudes toward the outer side.

The thick part 32 substantially has a ridge shaped cross section. An apex 80 of the thick part 32 as a part thicker than at least one other part of the thick part 32 is closer to an end (a side of an end part of the second outer-cabin side wall 222*a*) than a center of the first outer-cabin side wall 221*a* in cross section. Slopes extend toward the end of the first outer-cabin side wall 221*a* and toward an opposite side (side of the first bent point 221P) from the apex 80, respectively. In the present embodiment, thickness 90 on a position of the apex 80 of the thick part 32 is thicker than at least one other part of the hollow seal member 22.

As shown in FIG. 2, when the hollow seal member 22 makes elastic contact with the back door 100 in a closed position, the protrusion 31 falls toward a side of the thick part 32 and the hollow seal member 22 bends with the first bent point 221P sinking toward a direction 110 indicated by an arrow, which is toward the inner-cabin side (side opposite to the back door 100 in the closed position).

Figure 7:
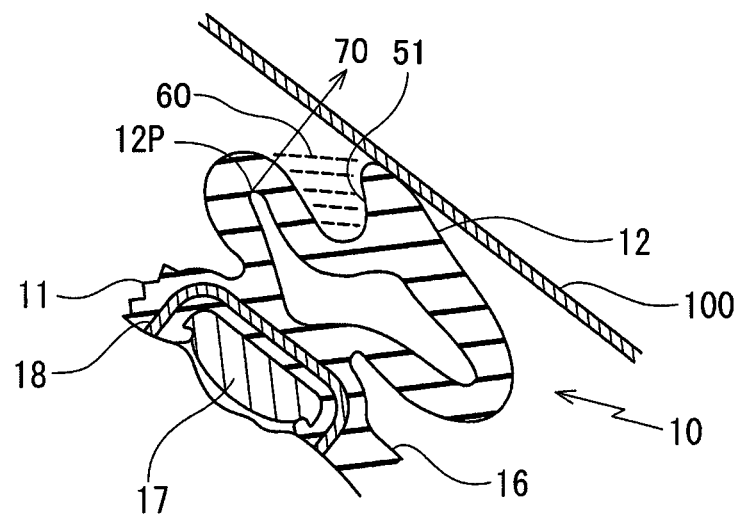
FIG. 7 is an enlarged cross section of an important part of the weather strip for automobiles of FIG. 6, showing a state that a hollow seal part makes elastic contact with a door and bends.

The structure that the protrusion 31 falls toward the side of the thick part 32 controls a channel 52 for water 60 to collect to be smaller than a prior art (channel 51 in FIG. 7). The structure controls problems that, as the back door 100 is opened, the water 60 thus collected drips and trickles into the automobile or splashes on passengers or luggage.

The structure that the hollow seal member 22 bends with the first bent point 221P sinking does not allow the channel 52 to have a shape of a pail. As a result, amount of water 60 which collects in the channel 52 is controlled to be very little.

In the present embodiment, the protrusion 31 is on the side of the first hollow wall 221 with respect to the straight line 40 which divides the hollow seal member 22 into halves. But any protrusion 31 is usable, which falls toward the side of the thick part 32 for narrowing the space between the thick part 32 and the protrusion 31 when the hollow seal member 22 makes elastic contact with the back door 100. Variations of the protrusion 31 include a protrusion 31 of a second embodiment shown in FIG. 3, which extends in a direction of the straight line 40 which divides the hollow seal member 22 into halves. The structure of the second embodiment preferably fulfills one of the following conditions: thickness 221T on the end of the first outer-cabin side wall 221a is thinner than thickness 222T on the end of the second outer-cabin side wall 222a; or as indicated by an arrow of a two dotted chain line in FIG. 3, a line defined by a track of movement of the back door 100 inclines with respect to the straight line 40.

Figure 3:
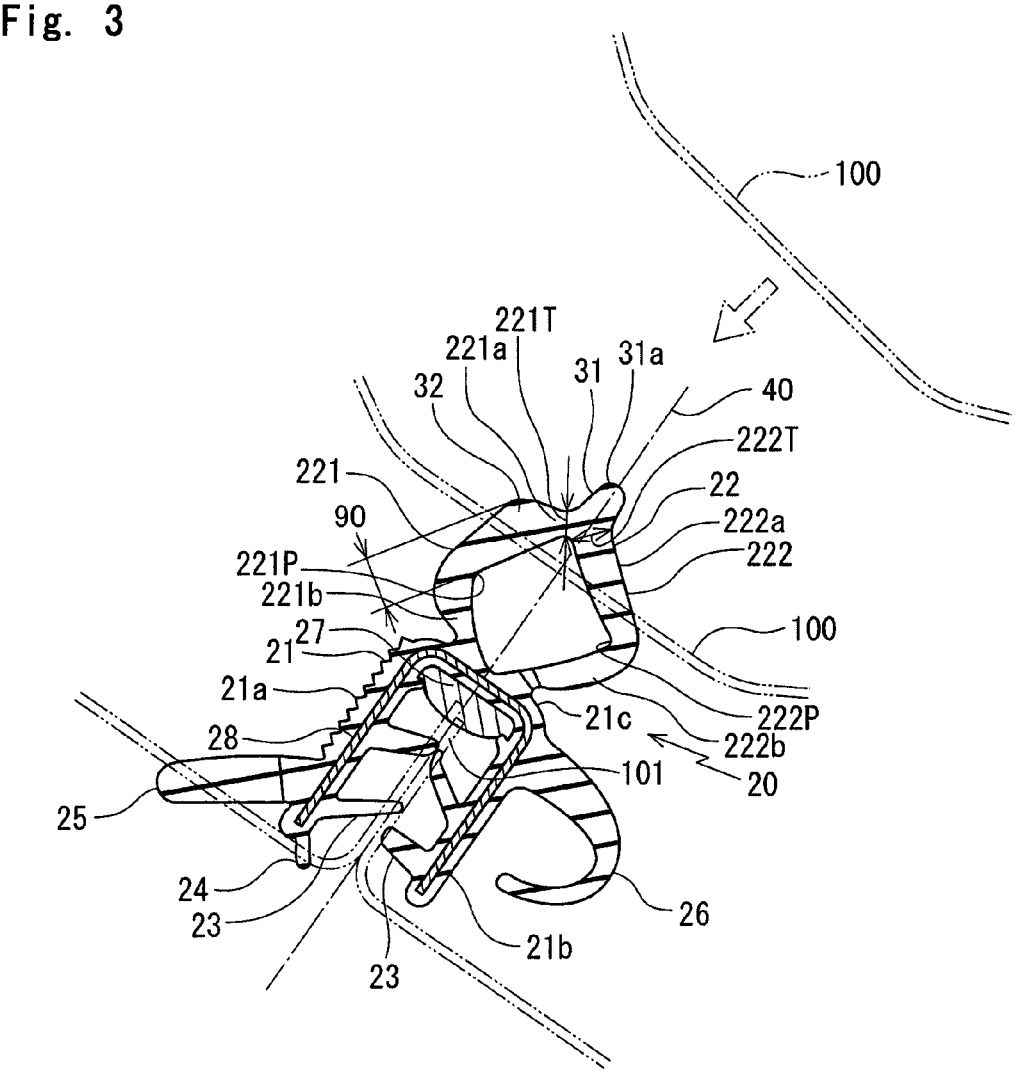
FIG. 3 is an I-I line enlarged cross section of FIG. 5, showing another weather strip for automobiles according to the embodiment of the present invention.

Alternatively, the structure of the second embodiment may fulfill both the following conditions: the thickness 221T on the end of the first outer-cabin side wall 221a is thinner than the thickness 222T on the end of the second outer-cabin side wall 222a; and as indicated by the arrow of the two dotted chain line in FIG. 3, the line defined by the track of movement of the back door 100 inclines with respect to the straight line 40. The conditions on the thickness 221T and 222T on the first outer-cabin side wall 221a and the second outer-cabin side wall 222a and the line defined by the track of movement of the back door 100 are also applicable to the first embodiment.

Figure 4A:
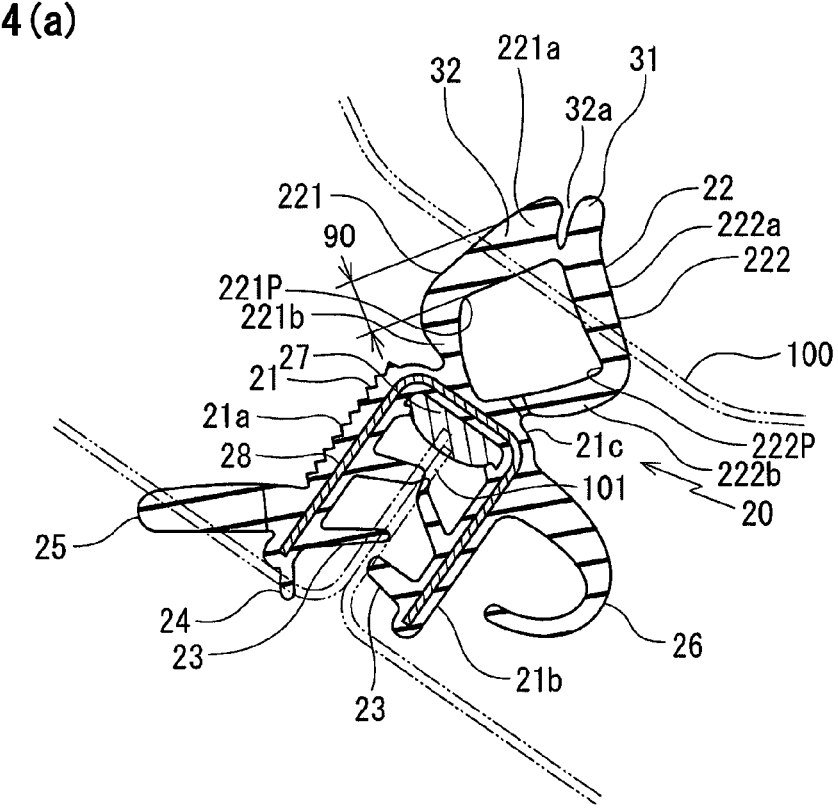
FIG. 4(a) and FIG. 4(b) show still another weather strip for automobiles according to the embodiment of the present invention.
Figure 4B:
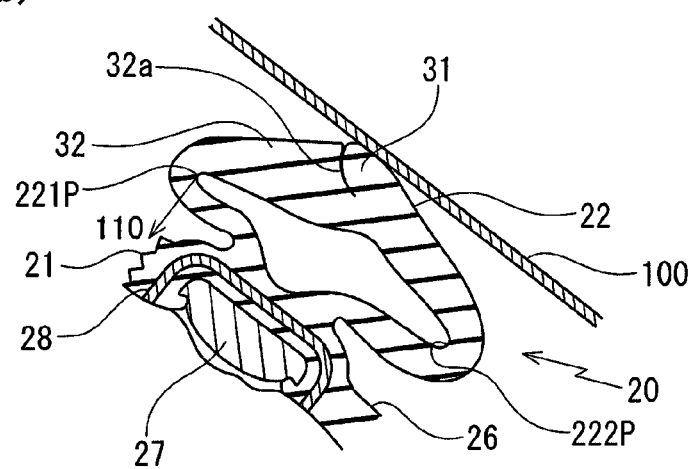

Alternatively, as shown in FIG. 4(a), a concave 32a may be formed on the thick part 32 on a side of the protrusion 31 for the protrusion 31 having a convex shape to be fit therein. According to the structure, as shown in FIG. 4(b), when the back door 100 is in the closed position, the protrusion 31 which falls toward the side of the thick part 32 abuts with and is fit in the concave 32a so that the space does not appear between the thick part 32 and the protrusion 31. Variations of the structure are usable as long as the protrusion 31 and the thick part 32 abut with each other without the space therein. The variations include a structure that, in a manner opposite to FIG. 4, a protrusion having a convex shape is formed on a top end of the thick part 32, and a concave is formed on a base root of the protrusion 31 for the protrusion having the convex shape to be fit therein.

In the present embodiment, the thick part 32 is gradually reduced in thickness toward a side of the first bent point 221P of the first outer-cabin side wall 221a, and when the hollow seal member 22 makes elastic contact with the back door 100, the first bent point 221P sinks toward the inner-cabin side. Alternatively, the thick part 32 may be reduced in rigidity on a side of the first bent point 221P of the first outer-cabin side wall 221a for the first bent point 221P to sink toward the inner-cabin side. The rigidity may be reduced by forming the thick part 32 on the side of the first bent point 221P with soft materials.

In the present embodiment, the weather strip 20 for automobiles is operatively coupled along the circumferential edge of the opening of the back door 100 of the automobile body, and the weather strip 20 for automobiles makes elastic contact with the back door 100. But the weather strip 20 for automobiles is also applicable to movable doors including laterally openable doors and roofs.

We claim:

1. A weather strip for automobiles comprising:
   an installation base member configured to be coupled along a circumferential edge of a door opening of an automobile body; and
   a hollow seal member integrally molded with the installation base member and configured to make elastic contact with a door of the automobile body, the hollow seal member including:
      a first wall having a first outer-cabin segment, a first inner-cabin segment, and a first bent point on an inside surface of the first wall and bendable toward an outside surface of the first wall opposite the inside surface of the first wall;
      a second wall having a second outer-cabin segment, a second inner-cabin segment, and a second bent point on an inside surface of the second wall and bendable toward an outside surface of the second wall opposite the inside surface of the second wall, the first wall and the second wall being connected with each other such that the first bent point and the second bent point are spaced apart from each other;
   a protrusion formed on an end of the second outer-cabin segment of said second wall, the protrusion being continuous with the outer surface of the second wall, the protrusion protruding in a direction away from the installation base member and configured to make elastic contact with said door, an outer-cabin end of the first outer-cabin segment connecting with the second outer-cabin segment of said second wall at a position on the inside surface of said second wall, said protrusion protruding in a direction away from the installation base member from the position; and
   a thick part formed on a portion of the outside surface of the first outer-cabin segment of said first wall, the thick part protruding in a direction away from the inside surface of the first outer-cabin segment, said thick part gradually reduced in at least one of thickness or rigidity towards said first bent point of said first outer-cabin segment, the thick part having an apex thicker than at least one other part of the thick part closer to the outer-cabin end of the first outer-cabin segment than a center of the first outer-cabin segment and slopes toward the outer-cabin end of the first outer-cabin segment and toward the inside surface of the first wall from the apex,
   wherein when said hollow seal member makes elastic contact with said door, said hollow seal member bends with said first bent point sinking toward the installation base member, and the protrusion falls toward the side of the thick part to narrow a space of a channel defined between the protrusion and the first outer-cabin segment.

2. The weather strip for automobiles as claimed in claim 1, wherein: an outer-cabin end of said protrusion is on a side of said first wall with respect to a straight line which divides said hollow seal member in cross section into the side of said first wall and a side of said second wall.

3. A weather strip for forming a seal between a door opening of an automobile body and a door of the automobile body, the weather strip comprising:
   a seal member including:
      a first wall having a first inner segment and a first outer segment, the first inner segment having an inner end configured to secure to an installation base member and an outer end, the first outer segment having an inner end joined to the outer end of the first inner segment at a first bent point, the first outer segment having an apex between the inner end and outer end thereof, the first outer segment having a first thickness at the inner end thereof, a second thickness at the apex, and a third thickness at the outer end thereof, the second thickness being greater than the first and third thicknesses;

a second wall having a second inner segment and a second outer segment joined at a second bent point, an outer end of the first outer segment connected to the second outer segment of the second wall to define a cavity the seal member; and a protrusion extending from an outer end of the second outer segment, the protrusion configured to make elastic contact with a door such that the outer ends of the first and second outer segments move in a first direction towards inner ends of the first and second inner segments, the first bent point moves in a second direction transverse to the first direction, and the second bent point moves in a third direction transverse to the first direction and opposite the second direction, and the protrusion falls towards the first outer segment to narrow a space of a channel defined between the protrusion and the first outer segment.

4. The weather strip according to claim 3, further comprising the installation base member integrally formed with seal member.

5. The weather strip according to claim 4, wherein the inner end of the first inner segment extends from the installation base member and the inner end of the second inner segment extends from the installation base member.

6. The weather strip according to claim 4, wherein the installation base member is configured to couple to a circumferential edge of a door opening of an automobile body.

7. The weather strip according to claim 3, wherein the third thickness is greater than the first thickness.

8. The weather strip according to claim 3, wherein an inside surface of the first outer segment defining the cavity is linear from the inner end to the outer end thereof.

9. The weather strip according to claim 3, wherein the apex is closer to the outer end than the inner end of the first outer segment.

* * * * *